United States Patent
Ronda et al.

(10) Patent No.: US 9,598,638 B2
(45) Date of Patent: Mar. 21, 2017

(54) SCINTILLATOR MATERIAL (71) Applicant: KONINKLIJKE PHILIPS N.V., Eindhoven (NL)

(72) Inventors: Cornelis Reinder Ronda, Aachen (DE); Jacobus Gerardus Boerekamp, Someren (NL); Sandra Johanna Maria Paula Spoor, Eindhoven (NL); Anne-Marie Andree Van Dongen, Waalre (NL); Herfried Karl Wieczorek, Aachen (DE); Wilhelmus Cornelis Keur, Weert (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/440,681

(22) PCT Filed: Oct. 31, 2013

(86) PCT No.: PCT/EP2013/072791
§ 371 (c)(1),
(2) Date: May 5, 2015

(87) PCT Pub. No.: WO2014/075929
PCT Pub. Date: May 22, 2014

(65) Prior Publication Data
US 2015/0275080 A1 Oct. 1, 2015

(30) Foreign Application Priority Data

Nov. 14, 2012 (EP) .................................... 12192604

(51) Int. Cl.
*G01T 1/202* (2006.01)
*C09K 11/77* (2006.01)
(Continued)

(52) U.S. Cl.
CPC .......... *C09K 11/7774* (2013.01); *C04B 35/01* (2013.01); *C04B 35/44* (2013.01);
(Continued)

(58) Field of Classification Search
CPC ...................................................... G01T 1/202
See application file for complete search history.

(56) References Cited

U.S. PATENT DOCUMENTS 6,458,295 B1   10/2002   Yamada et al.
6,630,077 B2   10/2003   Shiang et al.
(Continued)

FOREIGN PATENT DOCUMENTS

JP   2007246653 A   9/2007
JP   2012066994 A   4/2012
(Continued)

OTHER PUBLICATIONS

Kamada, K., et al.; 2 inch diameter single crystal growth and scintillation properties of Ce:Gd3Al2Ga3O12; 2012; Journal of Crystal Growth; 352(1)88-90.
(Continued)

*Primary Examiner* — David Porta
*Assistant Examiner* — Hugh H Maupin (57) ABSTRACT

A gamma photon detector for detecting 511 keV PET radiation includes a scintillator host material doped with cerium. The cerium is present in a concentration of 0.1 to 1.0 mol %. Lower concentrations increase light output but also decay times which can lead to pile up issues. The higher light output enables the read out area to be decreased which reduces the pile up issues. Embodiments with a cerium concentration as low as 0.15 to 0.2 mol % and a read out area as low as 0.1 cm² are contemplated.

20 Claims, 7 Drawing Sheets

(51) Int. Cl.
  *C04B 35/01* (2006.01)
  *C04B 35/44* (2006.01)
  *C04B 35/547* (2006.01)
  *G01T 1/20* (2006.01)
  *G01T 1/29* (2006.01)

(52) U.S. Cl.
  CPC .......... *C04B 35/547* (2013.01); *G01T 1/2006* (2013.01); *G01T 1/2023* (2013.01); *G01T 1/2985* (2013.01); *C04B 2235/3208* (2013.01); *C04B 2235/3213* (2013.01); *C04B 2235/3215* (2013.01); *C04B 2235/3217* (2013.01); *C04B 2235/3224* (2013.01); *C04B 2235/3225* (2013.01); *C04B 2235/3229* (2013.01); *C04B 2235/3286* (2013.01); *C04B 2235/764* (2013.01)

(56) References Cited

U.S. PATENT DOCUMENTS

| | | |
|---|---|---|
| 6,793,848 B2 | 9/2004 | Vartuli et al. |
| 7,008,558 B2 | 3/2006 | Vartuli et al. |
| 7,560,046 B2 | 7/2009 | Lyons et al. |
| 2001/0040219 A1* | 11/2001 | Cherry .................... G01T 1/202 250/363.03 |
| 2004/0066883 A1 | 4/2004 | Kanai et al. |
| 2006/0219927 A1 | 10/2006 | Venkataramani et al. |
| 2008/0017802 A1 | 1/2008 | Nakamura et al. |
| 2010/0219345 A1* | 9/2010 | Franch .................. G01T 1/1642 250/362 |
| 2011/0303873 A1 | 12/2011 | Fukuta et al. |
| 2012/0223236 A1 | 9/2012 | Shah et al. |
| 2013/0306874 A1* | 11/2013 | Yoshikawa ........ C09K 11/7774 250/361 R |

FOREIGN PATENT DOCUMENTS

| | | |
|---|---|---|
| JP | 2012180399 A | 9/2012 |
| WO | 2012105202 A1 | 9/2012 |

OTHER PUBLICATIONS

Ronda, C., ed.; Luminescence: From Theory to Applications; 2007; Wiley-VCH; pp. 1-277.

* cited by examiner

SCINTILLATOR MATERIAL

FIELD OF THE INVENTION

The invention relates to a scintillator material for use in gamma photon detection, and more particularly for use in a gamma photon detector in the field of PET imaging.

BACKGROUND OF THE INVENTION

In PET imaging a radiotracer is administered to a subject such as a patient or an animal prior to its positioning in the imaging region of a PET imaging system. The radiotracer is absorbed by regions in the subject and its distribution is imaged following an uptake period. Subsequently a clinician interprets images showing the relative uptake of the radiotracer at particular sites and may perform a diagnosis of the subject. The radiotracer undergoes radioactive decay which results in the production of positrons. Each decay event produces one positron which travels up to a few mm in human tissue, where it subsequently interacts with an electron in an annihilation event that produces two oppositely-directed gamma photons. The two gamma photons each have an energy of 511 keV and are detected by gamma photon detectors disposed radially around the imaging region which each produce an electrical signal when struck by an incident gamma photon. The resulting electrical signals are processed by coincidence-detection circuitry which, through the position of the detectors, determine a line in space along which the annihilation event occurred. Gamma photons received within +/−3 ns of each other are typically accepted as being coincident. The endpoints of this line are defined by the two positions at which the coincident events are detected and the line is termed a Line Of Response (LOR). Such LORs are subsequently reconstructed to produce a two- or three-dimensional image illustrative of the distribution of radiotracer within the imaging region.

In time-of-flight (TOF) PET the small time difference between the two detected events is further used to localise the position along the LOR at which the annihilation event occurred, and thus more accurately locate the spatial position of the radiotracer causing the decay event. In depth-of-interaction (DOI) PET, multi-layered detectors located at different radial distances from the imaging region further detect the depth at which the gamma photon is absorbed. In DOI PET this information is used to further improve the spatial resolution of detection by reducing parallax errors.

In PET imaging systems a gamma photon detector is defined hereinafter to comprise a scintillator material and an optical detector. The scintillator material creates a pulse of scintillation light when struck by a gamma photon, and the optical detector, which is optically coupled to the scintillator material, converts the pulse of scintillation light into an electrical signal. When a gamma photon strikes the scintillator material, probabilistic events determine the depth at which the scintillation light is generated, at which point it transfers its energy to the scintillator and the pulse of scintillation light having both a characteristic wavelength spectrum and a characteristic decay time is created. The scintillator material is further characterised by an absorption depth within which a proportion 1/e of the received gamma photons are absorbed. Due to the high energy of the incident gamma photons, dense scintillator materials are preferred in order to absorb a high proportion of incident gamma photons within a practical depth of scintillator material.

Owing to the process of determining the spatial position of radioactive decay events through coincidence, a gamma photon detector in a PET imaging system must be capable of discriminating between the incidence of individual gamma photons. A key parameter which characterises this ability is the maximum gamma photon detection rate. The ability to measure high incidence, or count rates, is desirable in the measurement of images with high signal to noise ratio within short acquisition times. Short acquisition times are important in the prevention of patient motion-induced artifacts in the images. The maximum gamma photon detection rate is affected by the decay of the scintillation light. The decay time of the scintillation material determines the minimum time interval between consecutively-incident gamma photons after which their scintillation light no longer overlaps. Such overlapping events, termed pile-up, must be prevented because they inhibit the ability to count the reception of individual photons. The need to reduce the decay time in PET scintillator materials is further driven by the demand for good timing resolution in TOF-PET. The state of the art in decay time is currently 25 ns in $LaBr_3$ with current research efforts emphasizing the need to reduce this even further.

Light yield and energy resolution are two further scintillator material parameters that characterise a gamma photon detector, particularly in a PET imaging system. The light yield from a scintillator material is the number of scintillation photons that are produced by an incident gamma photon. Light yield is typically normalized to the energy of the gamma photon and expressed as the number of photons produced per MeV. A high light yield, thus a sensitive scintillation material is desirable in the provision of a high signal to noise ratio gamma photon detector since it provides the associated optical detector with a strong light pulse in response to each incident gamma photon. Scintillator materials with good energy resolution provide an additional means of verifying that two photons detected within a narrow time interval indicate a valid LOR. By rejecting events that lie outside a predefined energy window, a PET imaging system may discriminate between scattered gamma photons whose trajectories have been altered by intervening matter and which have energies that lie outside the window, and gamma photons indicative of a valid LOR. One method of providing such discrimination is to determine the energy of each received gamma photon by integrating the scintillation light pulse, and to only accept it as being a valid coincidence event if it is both detected within a narrow time interval of another gamma photon, as well as if its energy is within a narrow energy window of non-scattered gamma photons. Good energy resolution is provided through the use of materials having a large value of effective atomic number. When determining the energy of a gamma photon in this way, pile-up must again be prevented by ensuring the scintillation light decays to a level where it no longer interferes with that from a subsequent gamma photon, and this again requires a short decay time.

In summary, the design of a gamma photon detector, particularly that used in a PET imaging system is driven fundamentally by the need to acquire high quality images with which a clinician can make an accurate diagnosis of a subject. High quality images, or more specifically high signal to noise ratio images demand a sensitive gamma photon detector which also meets the fast timing constraints associated with minimising the duration of the imaging process. This places a number of constraints on the gamma photon detector's scintillator material and optical detector. These are driven primarily by the need for a scintillator material with a short decay time. Providing the light yield from the scintillator material is sufficiently high to give an acceptable signal to noise ratio, an optical detector is subsequently optimised such that its responsivity is improved within the region of optical wavelengths emitted by the scintillator material. Typically, photomultiplier tube (PMT) detectors are used as the optical detector in what is termed analogue PET, and more recently solid state semiconductor optical detectors, defined herein as optical detectors produced using monolithic processes in semiconductors have been used to provide a more integrated system, in what is termed digital PET.

The shortest scintillator decay times in scintillator materials suitable for use in gamma photon detectors are conventionally found in blue-emitting scintillator materials (see for instance: Luminescence: From Theory to Applications, Wiley-VCH, Darmstadt, 2007, C. Ronda (Ed.)). Consequently blue-emitting scintillator materials are preferred, and the associated optical detector, typically a PMT in analogue PET imaging systems, is optimised to provide high sensitivity at around 420 nm wavelength, the emission peak of NAI:TI. Bi-alkali photocathode tubes are typically used since they are commercially available. Blue-sensitive photomultiplier tubes are preferred furthermore because although green/yellow sensitive photomultipliers having multi-alkali photocathodes are available, their lower quantum efficiency renders them less efficient.

Known scintillator materials for PET (Luminescence: From Theory to Applications, Wiley-VCH, Darmstadt, 2007, C. Ronda (Ed.)) include LYSO, LaBr$_3$ and the broad group of materials known as garnets (US2006/0219927A1). Scintillation in LYSO has been reported with a light yield of 33000 photons/MeV in the presence of a decay time of 44 ns, a high density of 7.1 g/cm$^3$, and an energy resolution of approximately 10%, defined as the ratio of the FWHM of the energy detection peak to the peak detection energy. In LaBr$_3$ a decay time of 25 ns has been reported with an improved energy resolution of 3% and higher light yield than LYSO. In the single crystal garnet Ce:Gd$_3$Al$_2$Ga$_3$O$_{12}$ a light yield of 35000 photons/MeV with a 68 ns decay time has been reported for 1% cerium concentration (K. Kamada et al: 2 inch diameter single crystal growth and scintillation properties of Ce:Gd$_3$Al$_2$Ga$_3$O$_{12}$. Journal of Crystal Growth 352, 2012, 88-90).

US2012/0223236A1 discloses ceramic garnet compositions according to the composition (Lu, Gd)$_3$(Al, Ga)$_5$O$_{12}$. In one example composition (Gd$_{0.497}$Lu$_{0.497}$Ce$_{0.006}$)$_{3.04}$(Al$_{0.6}$Ga$_{0.04}$)$_5$O$_{12.06}$ a decay time of approximately 40 ns is reported.

JP2012-180399 discloses a number of garnet compositions according to the composition Gd$_{3-x-y}$Ce$_x$RE$_y$Al$_{5-z}$M$_z$O$_{12}$ wherein M may be Ga and RE, a rare earth, may be Lu. Crystalline compositions are observed to give rise to a high light yield of up to 68000 photons/MeV. The one disclosed ceramic composition has a light yield of 28000 photons/MeV.

JP2012-066994A discloses a number of single crystal garnet compositions according to the composition Gd$_{3-x-y}$Ce$_x$RE$_y$Al$_{5-z}$Ga$_z$O$_{12}$ wherein RE may be Lu.

As in the above citations, single crystal materials are investigated almost exclusively owing to the best combination of stopping power, decay time and light yield being found in single crystal materials.

SUMMARY OF THE INVENTION

It is an object of the invention to provide a scintillator material for use in gamma photon detection with improved sensitivity. It is a further object of the invention to provide a scintillator material for use in a gamma photon detector with improved sensitivity, and furthermore to provide a scintillator material for use in a PET imaging system with improved sensitivity.

This object is achieved by the scintillator material comprising a scintillator host material doped with cerium; wherein the scintillator host material is at least one of the group comprising i) garnets ii) CaGa$_2$S$_4$ iii) SrGa$_2$S$_4$ iv) BaGa$_2$S$_4$ v) CaS vi) SrS; and wherein the amount of cerium is in the range 0.1 mol % to 1.0 mol %. According to a first aspect of the invention; when the amount of cerium is within this range in this group of host materials the interaction between the cerium activator ions and the host material causes scintillation light to be emitted with a surprisingly high light yield in response to incident gamma photons. The high light yield demonstrates improved sensitivity to gamma photons. This light yield is particularly surprising because it was recorded in a ceramic scintillator material, and such ceramic materials are typically considered to possess inadequate light yields for use as scintillator materials. Further benefits arising from the disclosed scintillator materials include their lower cost which arises from their reduced rare earth content as compared to existing scintillator materials. As the cerium concentration is increased in these materials within this range both the light yield and the decay time decrease. The upper limit of the cerium concentration in these scintillator materials avoids the concentration quenched regime; a region in which the cerium causes the light yield to fall to a level below which good energy resolution can be obtained. By so restricting the lower limit of the cerium concentration a falloff in light yield at low cerium concentrations is avoided, and furthermore the decay time does not become so long that it degrades timing performance. Consequently there is a narrow defined cerium concentration range within which useful scintillation can be achieved in the disclosed scintillator host materials. The high light yield achieved within this range makes the scintillator material suitable for discriminating between different gamma photon energies and therefore particularly useful in a gamma photon detector, and as such in a PET imaging system.

According to another aspect of the invention the disclosed group of scintillator materials has a substantially ceramic structure. Ceramics have the benefits of being easier to fabricate and shape, requiring reduced post-processing as compared to more ordered structures.

According to another aspect of the invention the disclosed group of scintillator materials has a substantially polycrystalline structure. Increasing the structural order of the scintillator material by moving from a ceramic to polycrystalline structure, acts to improve its optical transparency at the peak emission wavelength. This reduces the probability of re-absorption of scintillation light, thus improving the sensitivity of a gamma photon detector or a PET imaging system made with such a scintillator material.

According to another aspect of the invention the disclosed group of scintillator materials has a substantially crystalline structure. This even further improves its optical transparency and therefore the sensitivity of a gamma photon detector or a PET imaging system made with such a scintillation material.

According to another aspect of the invention the stoichiometry of the scintillator material composition is controlled in order to improve its optical transparency. A high optical transparency improves the light extraction efficiency and therefore improves the sensitivity of the scintillator material.

According to another aspect of the invention the composition of the disclosed group of scintillator materials is controlled such that its density lies in the range 5 to 8 g/cm$^3$. This range of high densities in a scintillator material is particularly useful as it results in a reduced gamma photon stopping distance. When used in a gamma photon detector this reduces the scintillator's thickness and cost.

According to another aspect of the invention the optical responsivity of the optical detector in a gamma photon detector using the scintillator materials of the present invention is improved at the near-green wavelengths of the optical emission spectrum of the disclosed group of scintillator materials. This results in improved sensitivity to gamma photons. Preferably the optical detector has high optical responsivity, or a peak optical responsivity in the wavelength range 450 nm to 700 nm, and even more preferably in the wavelength range 500 nm to 650 nm.

The scintillation light emission spectrum that results from doping the disclosed group of host materials with cerium is inherently close to the green region of the optical spectrum at around 550 nm, thus well-removed from the blue light emission wavelengths that are usually associated with a short decay time. The emission spectrum of these cerium-doped host materials would therefore conventionally be considered unlikely to yield a scintillator material suitable for use in PET imaging. Indeed, when controlled in this range, the cerium dopant leads to a comparatively long decay time in the region of 60-300 ns, thus well-removed from the short decay times conventionally sought for use in current PET imaging systems. As described above, the decay time of a scintillator material used in a gamma photon detector affects its maximum count rate. If the decay time is too long then pile-up occurs, preventing accurate discrimination between individual gamma photons. Thus both the emission spectrum and the measured decay time in the disclosed group of cerium-doped host materials both point to a scintillator material that is unsuitable for use as a gamma photon detector and in a PET imaging system. However, a tradeoff exists between the gamma photon receiving area and the scintillator decay time in a gamma photon detector, and furthermore in a gamma photon detector in a PET imaging system wherein for a given gamma photon flux density a longer scintillator decay time can be tolerated when the gamma photon receiving area is reduced. This tradeoff can be exploited in order to render the comparatively long decay time scintillator materials of the present invention suitable for use in a gamma photon detector and in a PET imaging system when conventional prejudice would preclude their use on account of it being too long.

The tradeoff is that, all other things being equal, in a gamma photon detector the maximum detectable gamma photon flux density (gamma photons/cm$^2$·s) is proportional to the product of the gamma photon receiving area and the scintillator decay time. Consequently, pileup can be avoided by reducing the gamma photon receiving area.

As an example; if a maximum gamma photon flux density $P_1$ can be detected in a first gamma photon detector having a gamma photon receiving area $A_1$ and a decay time $tau_1$, then the same maximum gamma photon flux density $P_1$ can be detected in a second gamma photon detector which has a gamma photon receiving area $0.5A_1$ and a decay time $2tau_1$. This is consequent to the fact that for a fixed gamma photon flux density, reducing the gamma photon receiving area reduces proportionately the number of gamma photons received in a given time period.

Various implementations of this tradeoff are now described with reference to a gamma photon detector; and to analogue and digital PET imaging systems employing such a gamma photon detector. The benefits of these aspects of the invention are that they permit the use of the high light yield scintillator materials of the present invention which by virtue of their long decay time would otherwise be considered inappropriate. A further benefit of using these scintillator materials is that their inherent near-green emission is in a spectral region in which more sensitive optical detectors can be produced, resulting in a more sensitive gamma photon detector. This is particularly the case when used with solid state semiconductor optical detectors because detectors such as Silicon Photomultiplier (SiPM) and Avalanche Photodiode (APD) detectors can be adapted to have a high spectral responsivity at these wavelengths. It is noted that the reduction in gamma photon receiving area requires the selection of non-standard size optical detectors and reconfiguration of the imaging system's timing circuitry in order to issue additional timestamps.

Gamma photon detectors can be formed in different configurations. As defined above, a gamma photon detector comprises a scintillator material and an optical detector. The gamma photon receiving area of a gamma photon detector is that which results in scintillation light that is collected by its optical detector. For the avoidance of doubt, an optical detector has a distinct electrical output. An optical detector therefore corresponds to a single PMT detector in a typical analogue PET imaging system, and to a single pixel in a digital PET imaging system. Typically the gamma photon receiving area is the same as the active area of the optical detector and therefore a reduction in a gamma photon detector's gamma photon receiving area is accompanied by a reduction in the optical detector's active area. When more than one such gamma photon detector is combined to form a module, the module has a module gamma photon receiving area. In such a module the invention may be exploited by subdividing the module gamma photon receiving area into an increased number of smaller, gamma photon receiving areas and using an increased number of optical detectors with the longer decay time scintillator materials of the present invention. As with a single gamma photon detector, a reduction in the gamma photon receiving area of each gamma photon detector in the module may be accompanied by a reduction in the optical detector's active area.

Using $LaBr_3$ as a benchmark scintillator material with a decay time of 25 ns; a significant relaxation of the decay time requirement from 25 ns in $LaBr_3$ to 60 ns or more in the group of scintillator materials of the present invention can be achieved by reducing the gamma photon receiving area by a factor of at least 60/25=2.4 from that typically used. This may be accompanied by a reduction in optical detector active area by the same factor.

PMT optical detectors are in widespread use in gamma photon detectors. A typical PMT used in the detection of the radiotracer FDG in a PET imaging system has a diameter of 1.5", thus an active area of 11.4 cm$^2$. In analogue PET, seven such individual detectors are typically combined into a module that receives gamma photons from an area of approximately 80 cm$^2$; the outputs of these seven detectors being read-out simultaneously using Anger logic which identifies the individual detector receiving the gamma photon. In this example each PMT detector collects scintillation light from scintillator elements having a total cross sectional area that is the same as the active area of the optical detector; thus each gamma photon detector has a gamma photon receiving area of 11.4 cm$^2$. By reducing the gamma photon receiving area to (11.4/2.4=4.75 cm$^2$) thus approximately 5 cm$^2$ the scintillator materials of the present invention may therefore be used to give the same count rate performance as the short decay time materials currently in use. The smallest single-element PMT optical detector currently commercially available is the Hamamatsu R9880U having an active area of 0.5 cm$^2$. If this smaller PMT optical detector were used instead of the above reference PMT the scintillator decay time could be degraded by a factor of at least (11.4/0.5=22.8), thus to 25 ns×22.8=570 ns. This demonstrates considerable freedom to reduce both the gamma photon receiving area, and to reduce the corresponding optical detector active area when this aspect of the invention is exploited in a gamma photon detector with a PMT optical detector.

Solid state semiconductor optical detectors, however, may be miniaturised to a greater degree than PMTs. Therefore when scintillator materials of the present invention are used in a gamma photon detector in which the optical detector is a solid state semiconductor detector, and thus in a digital PET imaging system, far greater exploitation of the invention is possible. One example solid state semiconductor optical detector is the Hamamatsu S11064 series which comprises 16 pixels, each having an active area of 0.09 cm$^2$ and a combined active area of 1.5 cm$^2$. The reduction in the gamma photon receiving area from 11.4 cm$^2$ in the PMT example above to 0.09 cm$^2$ in this digital optical detector permits an increase in decay time from 25 ns in LaBr$_3$ to 25 ns×(11.4/0.09)=3170 ns, again showing considerable freedom to exploit the materials of the present invention in accordance with this aspect.

In summary, the high light yield scintillator materials of the present invention may be used to provide a more sensitive gamma photon detector when the gamma photon receiving area is in the following ranges: less than 5 cm$^2$; less than 2.5 cm$^2$; less than 1 cm$^2$; less than 0.5 cm$^2$; less than 0.2 cm$^2$; less than 0.1 cm$^2$. The active area of the optical detector in such a gamma photon detector may also be within the same ranges and gives rise to the same benefits. This gamma photon detector may further be used in a PET imaging system. Throughout this series of ranges the reduction in gamma photon receiving area permits the use of scintillator materials with increasingly long decay times. In the materials of the present invention as the cerium concentration is decreased the light yield increases and the decay time increases. Consequently the reduction in gamma photon receiving area throughout this series leads to a higher light yield and therefore a more sensitive gamma photon detector.

Two consequences of reducing the gamma photon receiving area in a PET imaging system are i) an increase in the total number of electrical signals to which time stamps must be issued, and ii) an improvement in the spatial resolution of the PET imaging system. In order for a PET imaging system to tolerate the longer decay time scintillator materials of the present invention whilst meeting the desired count rate associated with FDG measurement, the PET imaging system must be capable of issuing time stamps to each detected event represented by the electrical signals at the optical detector outputs at a sufficient rate. In practice the increased number of optical detector outputs with the reduction in gamma photon receiving area requires more complex electronic timing circuitry. If the system cannot meet these timing constraints, then the gamma photon receiving area tradeoff defined above results in a new, lower limit to the maximum gamma photon flux density that can be measured. In this way this aspect of the invention is not limited to a particular minimum gamma photon receiving area, or to a particular minimum optical detector area. The invention can therefore be exploited in the field of PET imaging in gamma photon detectors having a gamma photon receiving area, or further a pixel size as small as for example 1 square micron or less.

Practical PET imaging systems may also be classified as having a particular gamma photon readout area. This is the total area that receives gamma photons which is read-out by the PET imaging system consequent to the reception of a gamma photon. The readout process results in the identification of the spatial position within the readout area at which the gamma photon was received. The readout process is configuration-dependent. In a typical Analogue PET example one implementation currently has a readout area of approximately 80 cm$^2$ in which the outputs of seven PMTs, each having an optical detector area of 11.4 cm$^2$ are read-out following the reception of a gamma photon. Anger logic is subsequently used to determine the particular one of the seven detectors at which the gamma photon was received. In digital PET, one example implementation is the Philips Digital Photon Counter (PDPC) tile which has a readout area of approximately 10 cm$^2$. Here likewise, the reception of a gamma photon anywhere within this readout area triggers a readout process which results in the identification of the optical detector at which the gamma photon was received. In both examples the reception of a gamma photon renders the gamma photon readout area within which the gamma photon was received incapable of detecting another event for a period of time, a "deadtime" during which the readout takes place. This deadtime is affected by the scintillator decay time because as described earlier, the scintillation light must fall to a very low level between individual gamma photons in order to prevent the light from one event being misinterpreted as originating from an adjacent event in time. Typically the gamma photon readout area should not receive another gamma photon for a period of approximately 10× the scintillator decay time. Consequently the decay time tradeoff detailed above with respect to the gamma photon receiving area may also be described in terms of the gamma photon readout area: in a PET imaging system the maximum detectable gamma photon flux density (gamma photons/cm$^2$·s) is proportional to the product of the gamma photon readout area and the scintillator decay time. As with the gamma photon receiving area, reducing the gamma photon readout area allows for a proportionate increase in decay time, thereby permitting the use of a scintillator material which would otherwise be considered to possess too long a decay time. This results from the reduction in the number of detected events in any given time period with a reduction in the readout area.

The benefits of applying this aspect of the invention to a PET imaging system are now illustrated by way of practical examples. In analogue PET a typical gamma photon readout area of approximately 80 cm$^2$ was described above. Taking LaBr$_3$ as a benchmark scintillator material having a decay time of 25 ns; a significant relaxation of the decay time requirement from 25 ns in LaBr$_3$ to 60 ns or more in the group of scintillator materials proposed in the present invention can be achieved by reducing the gamma photon readout area by a factor of at least 60/25=2.4 from that typically used. To be clear, the use of the materials disclosed by the present invention in such a system would typically be considered inappropriate on account of their long decay times. However, by reducing the gamma photon readout area to 80 cm$^2$/2.4=33.3 cm$^2$ or less in analogue PET this aspect of the invention now renders these scintillator materials suitable. In practice this further requires the selection of a non-standard size optical detectors and a reconfiguration of the imaging system's timing circuitry in order to issue additional timestamps.

Such a prejudice against the use of comparatively long decay time scintillator materials also exists in the field of digital PET. However it has been realised that the reduced gamma photon readout area associated with digital PET as compared to analogue PET makes the present invention applicable here also. Since the gamma photon readout area is approximately (80 cm$^2$/10 cm$^2$) ⅛ of that in analogue PET, the scintillator materials of the present invention will, contrary to the decay time prejudice, work with the current PDPC readout area of approximately 10 cm$^2$ in digital PET. As in the example used in analogue PET, the scintillator materials of the present invention will also work by reducing the gamma photon readout area to less than 10 cm$^2$ in digital PET, for example by reducing it by the same factor of 2.4 to 10 cm$^2$/2.4=4.2 cm$^2$ or less. A further benefit of reducing the gamma photon readout area to less than 4.2 cm$^2$ is that such a PET imaging system becomes more tolerant of even longer decay times, and in the present materials an increase in decay time is accompanied by an increase in light yield; therefore a more sensitive scintillator is provided. Again, as in analogue PET, the reduction in the gamma photon readout area in digital PET further requires the selection of a non-standard size optical detectors and reconfiguration of the imaging system's timing circuitry in order to issue additional timestamps.

Consequent to the reduction in gamma photon readout area, the need to issue timestamps to additional signals demands increasingly complex and miniaturised electronic circuitry to accurately time the reception of each gamma photon. Specifically it demands an increased number of timing circuits which, in the measurement of a fixed gamma photon flux density, are used less frequently. The use of digital timing circuitry permits the practical implementation of such requirements. In this way the minimum gamma photon readout area that may be used is limited by the minimum pixel size that can be produced in a gamma photon detector; which can be as small as for example 1 square micron or less.

In summary, in both analogue and digital PET imaging systems a tradeoff exists between the gamma photon readout area and the scintillator decay time which can be exploited to make a more sensitive gamma photon detector by using the high light yield scintillator materials of the present invention which by virtue of their long decay time would otherwise be considered inappropriate. In analogue PET this can be achieved by using the materials of the present invention in a PET imaging system with a gamma photon readout area of less than 33 cm$^2$. By further reducing the gamma photon readout area, a longer decay time is tolerable, which may be achieved by using a lower cerium dopant concentration with the benefit of an increase in light yield. Thus in analogue PET a gamma photon readout area in the following ranges is appropriate: less than 33 cm$^2$; less than 15 cm$^2$; less than 10 cm$^2$; less than 5 cm$^2$; less than 2.5 cm$^2$; less than 1 cm$^2$; less than 0.5 cm$^2$; less than 0.2 cm$^2$; less than 0.1 cm$^2$; with the benefit of increasing light yields being attainable throughout this series by virtue of the lower cerium concentration that may be used.

In digital PET; the high light yield materials of the present invention may be used to provide a more sensitive gamma photon detector by using a gamma photon readout area of less than 10 cm$^2$. By further reducing the gamma photon readout area, again a longer decay time is tolerable. This may be achieved by using a lower cerium dopant concentration with the benefit of an increase in light yield. Thus in digital PET a gamma photon readout area in the following ranges is appropriate: less than 10 cm$^2$; less than 5 cm$^2$; less than 4 cm$^2$; less than 2 cm$^2$; less than 1 cm$^2$; less than 0.5 cm$^2$; less than 0.2 cm$^2$; less than 0.1 cm$^2$; with the benefit of increasing light yields being attainable throughout this series by virtue of the lower cerium concentration that may be used.

A further tradeoff exists in a gamma photon detector, and furthermore in a PET imaging system employing such, wherein the timing resolution of a gamma photon detector is proportional to the ratio of the light yield to the decay time. According to this relationship, a fixed timing resolution may be achieved in a gamma photon detector when the scintillator decay time is increased in the presence of a proportionate increase in light yield. In this way a scintillator material considered to have inadequate timing resolution owing to a long decay time, can in practice be used if the light yield is sufficiently high to compensate for the decay time; as is the case in the disclosed group of scintillator materials.

The timing resolution of a gamma photon detector is determined by the accuracy with which the leading edge of the electrical pulse produced consequent to the reception of a gamma photon can be determined, and has particular importance in Time-of-Flight PET imaging systems. Whereas in standard PET a timing resolution of better than 3 ns is typically acceptable, in TOF PET this is desirably less than 1 ns and preferably less than 500 ps. The accuracy of determining the time of this edge is dependent upon its amplitude and is improved by increasing the number of scintillation photons produced in response to a gamma photon, thus it improves with light yield. Furthermore, the amplitude of this rising edge is proportional to the ratio of the light yield to the decay time. Therefore an increased light yield in the scintillator material in the presence of a constant decay time will increase the amplitude of the electrical signal produced by a gamma photon detector. In TOF PET imaging systems it is desirable to improve the accuracy of detecting the time of reception of each gamma photon since this improves the accuracy of locating the spatial position of coincident decay events. This improves the resolution of images resulting from a TOF PET imaging system.

Using LYSO as a benchmark scintillator material in which a light yield and decay time of 33000 photons/MeV and 44 ns respectively are typically achieved; this results in a light yield to decay time ratio of 750 photons/MeV·ns. In the group of scintillator materials disclosed by the present invention a peak light yield of 60000 photons/MeV has been measured using the same optical detector as used to measure the LYSO benchmark. However the sensitivity of the optical detector used in the measurements on the scintillator materials disclosed herein was optimised for the blue wavelengths emitted by LYSO, and had a lower responsivity at the green emission wavelengths that were produced in the scintillator materials disclosed herein. When compared to LYSO, the scintillator materials disclosed herein have a peak equivalent light yield of 70170 photons/MeV and a corresponding decay time of 102 ns, thus a peak light yield to decay time ratio of 688 photons/MeV·ns. Therefore in spite of a longer decay time in the disclosed group of scintillator materials as compared to the LYSO benchmark, in TOF PET imaging the decay time is compensated-for by their high light yield and the disclosed group of materials have an acceptable timing resolution for TOF PET imaging. In these materials the ratio of light yield to decay time is high within the cerium concentration range 0.1 mol % to 1.0 mol %. In this range the light yield exceeds 40000 photons/MeV and the decay time is also suitable for TOF PET imaging. According to another aspect of the invention, by controlling the cerium concentration within the range 0.1 mol % to 1.0 mol % the light yield to decay time ratio exceeds approximately 600 photons/MeV·ns which identifies the material as being particularly useful in a TOF PET imaging system. A further improvement in timing resolution can be achieved within the narrower cerium concentration range of 0.15 mol % to 1.0 mol %, and even better timing resolution can be achieved within the cerium concentration range of 0.15 mol % to 0.4 mol %. Therefore by controlling the cerium concentration in the scintillator materials of the present invention both the light yield and the decay time can be adjusted in order to improve the timing resolution of a gamma photon detector.

DETAILED DESCRIPTION OF THE INVENTION

In order to provide a scintillator material for use in gamma photon detection with improved sensitivity, various embodiments of a scintillator material comprising a scintillator host material doped with cerium; wherein the scintillator host material is at least one of the group comprising i) garnets ii) $CaGa_2S_4$ iii) $SrGa_2S_4$ iv) $BaGa_2S_4$ v) CaS vi) SrS; and wherein the amount of cerium is in the range 0.1 mol % to 1.0 mol % are now described in an exemplary application of PET imaging.

Figure 1:
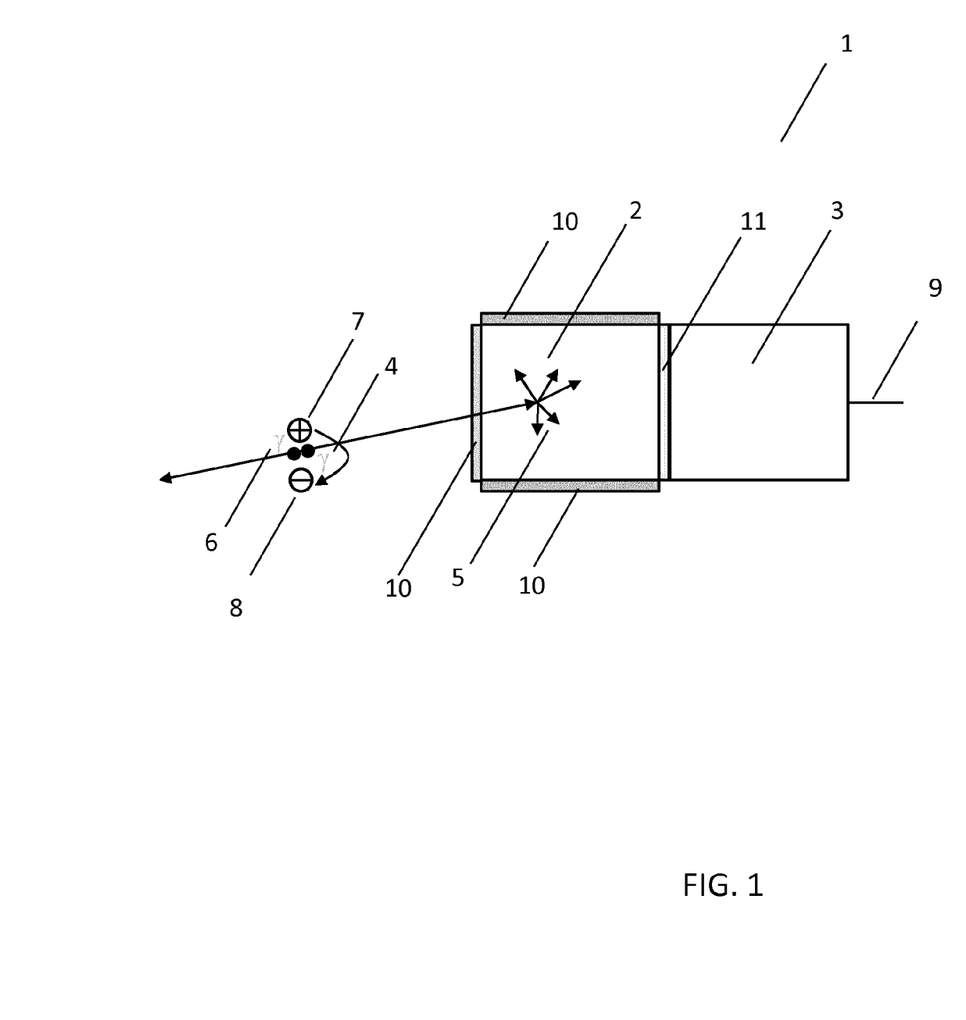
FIG. 1 illustrates an exemplary gamma photon detector in accordance with certain aspects of the invention

FIG. 1 illustrates an exemplary gamma photon detector in accordance with certain aspects of the invention. In FIG. 1, gamma photon detector 1 comprising scintillator material 2 and optical detector 3 are in optical communication. When in use, the reception of gamma photon 4 by scintillator material 2 results in the generation of scintillation light 5 comprising a plurality of photons having frequencies corresponding to the characteristic range of scintillation wavelengths of scintillator material 2. Typically the energies of the photons comprising the scintillation light are much smaller than that of the captured gamma photon 4 and thus the scintillation light may comprise wavelengths from the UV through the visible to the infrared region. Subsequently a portion of the scintillation light is captured by optical detector 3, resulting in an electrical signal 9 indicative of the capture of gamma photon 4, and which may subsequently be processed by electrical circuitry. Gamma photon 4 may be one of a pair of gamma photons 4, 6 wherein gamma photon 6 is an oppositely-directed gamma photon to 4. The pair of gamma photons may be formed as a consequence of an annihilation event following radioactive decay, wherein the radioactive decay produces positron 7 and is annihilated by electron 8. The source of the radioactive decay may be for example a radiotracer. Optical coatings 10 such as reflective layers may be used on faces other than those in optical communication with the optical detector in order to retain the scintillation light 5 so as to increase the portion of the scintillation light captured on the optical detector 3. An interface coating 11 disposed between scintillator material 2 and optical detector 3, such as an antireflection coating or an index matching coating, may also be used to improve the portion of scintillation light 5 captured by optical detector 3.

Figure 2:
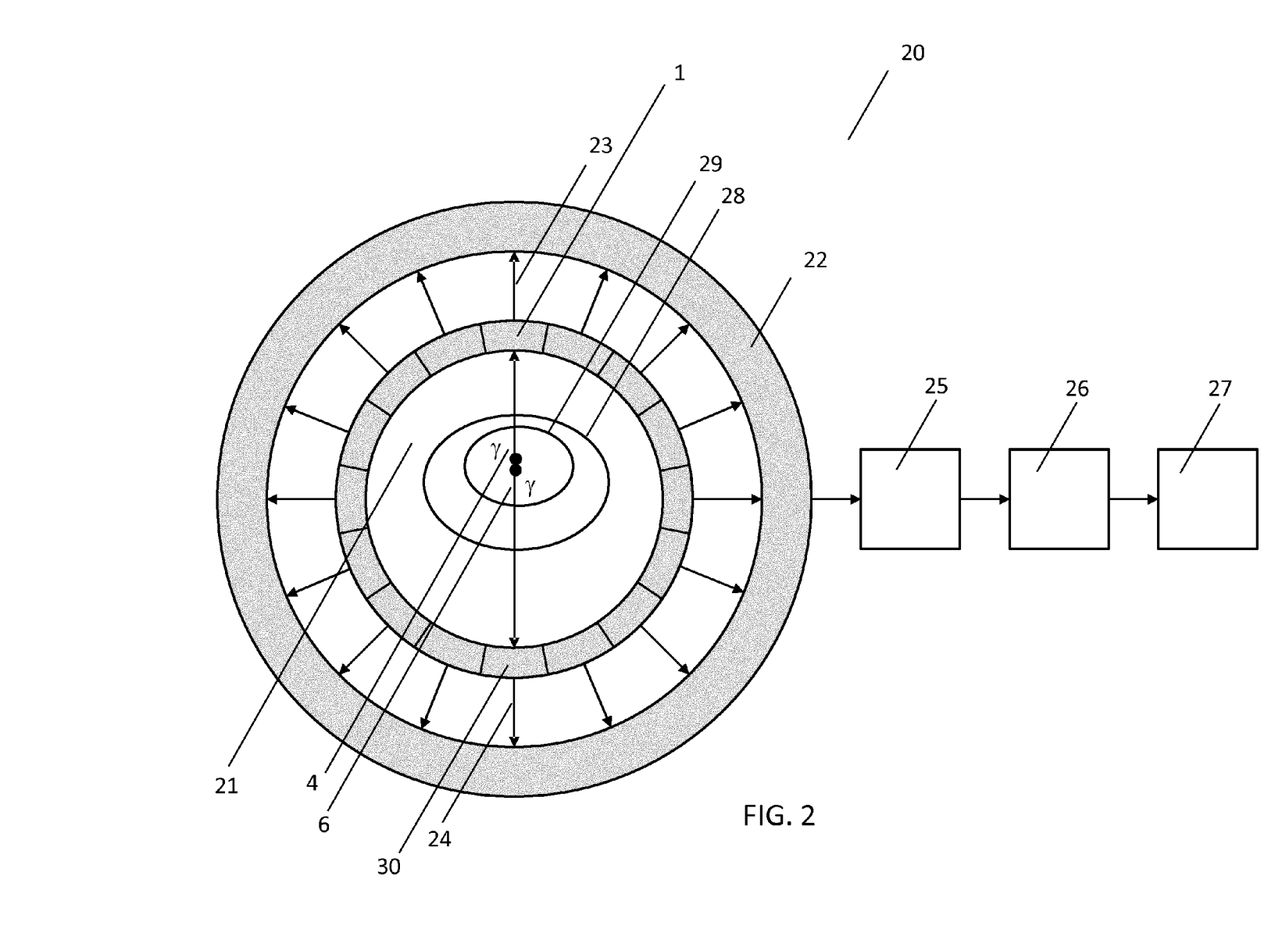
FIG. 2 illustrates an exemplary PET imaging system in accordance with certain aspects of the invention

FIG. 2 illustrates an exemplary PET imaging system in accordance with certain aspects of the invention. The exemplary photon detector of FIG. 1 may for example be used in the system illustrated in FIG. 2. In FIG. 2, PET imaging system 20 comprises two or more gamma photon detectors 1, 30 disposed radially about an imaging region 21. The two or more gamma photon detectors 1, 30 each produce an electrical signal 23, 24 indicative of a captured gamma photon, the electrical signals being in electrical communication with coincidence determination unit 22. Coincidence determination unit 22 assigns values comprising at least the time of incidence to each electrical signal 23, 24. Coincidence determination unit 22 further analyses the time associated with each captured photon and providing these occur within a narrow time interval, typically +/−3 ns, deems the captured photons as coincident. The coincidence determination unit may further analyse the energy of each captured photon and deem two photons as coincident if they both occur within a narrow time interval as well as have energies within a narrow energy window, typically within +/−10% of the peak gamma photon energy. Coincidence determination unit 22 is in communication with reconstruction processor 25 which constructs a line of response for each pair of captured photons deemed coincident and further processes multiple such lines of response in order to reconstruct data representing an image comprising the originating positions of the captured photons deemed coincident by the coincidence determination unit. Reconstruction processor 25 is in further communication with image processing unit 26 which is configured to process the data representing the originating positions of the coincident photons into a format suitable for presenting an image on an output device. Image processing unit 26 is in further communication with an output device 27 for presenting the image, such as a display, a printer and the like.

When in use, a portion of a subject to be imaged 28, such as portion of a human or animal body is positioned in imaging region 21 of the exemplary PET imaging system in FIG. 2. In the illustrated example it is desired to obtain imaging data from a portion 29 of the portion of the subject to be imaged 28. The portion 29 may represent a region or an organ within the subject in which it is desired to measure the uptake of a radiotracer. Prior to the positioning of the portion of the subject to be imaged 28 in the imaging region 21, a radiotracer may be administered to the subject, and an uptake period may be permitted to lapse prior to the commencement of imaging. During the imaging process the two or more gamma photon detectors 1, 30 capture gamma photons resulting from radioactive decay events within the imaging region, such as from the decay of a radiotracer administered to a subject. Following the imaging process the PET imaging system produces an image indicative of the distribution of the radiotracer within a portion 29 of the portion of a subject to be imaged 28.

According to a first embodiment a scintillator material 2, having exemplary application in a gamma photon detector such as that illustrated in FIG. 1, and having further exemplary application in a PET imaging system illustrated in FIG. 2 has the composition $(Gd_{2.7-y}Lu_{0.3}Ce_y)(Al_{2.5}Ga_{2.47}Lu_{0.03})O_{12}$ wherein the amount of cerium is in the range 0.1 mol % to 1.0 mol %. In this composition the cerium doping is represented by $Ce_y$. Improved sensitivity is achieved by further restricting the cerium concentration range, which is progressively reduced throughout the following series of ranges: 0.15 mol % to 1.0 mol %; 0.15 mol % to 0.6 mol %; 0.15 mol % to 0.5 mol %; 0.15 mol % to 0.4 mol %; 0.15 mol % to 0.2 mol %.

Figure 3:
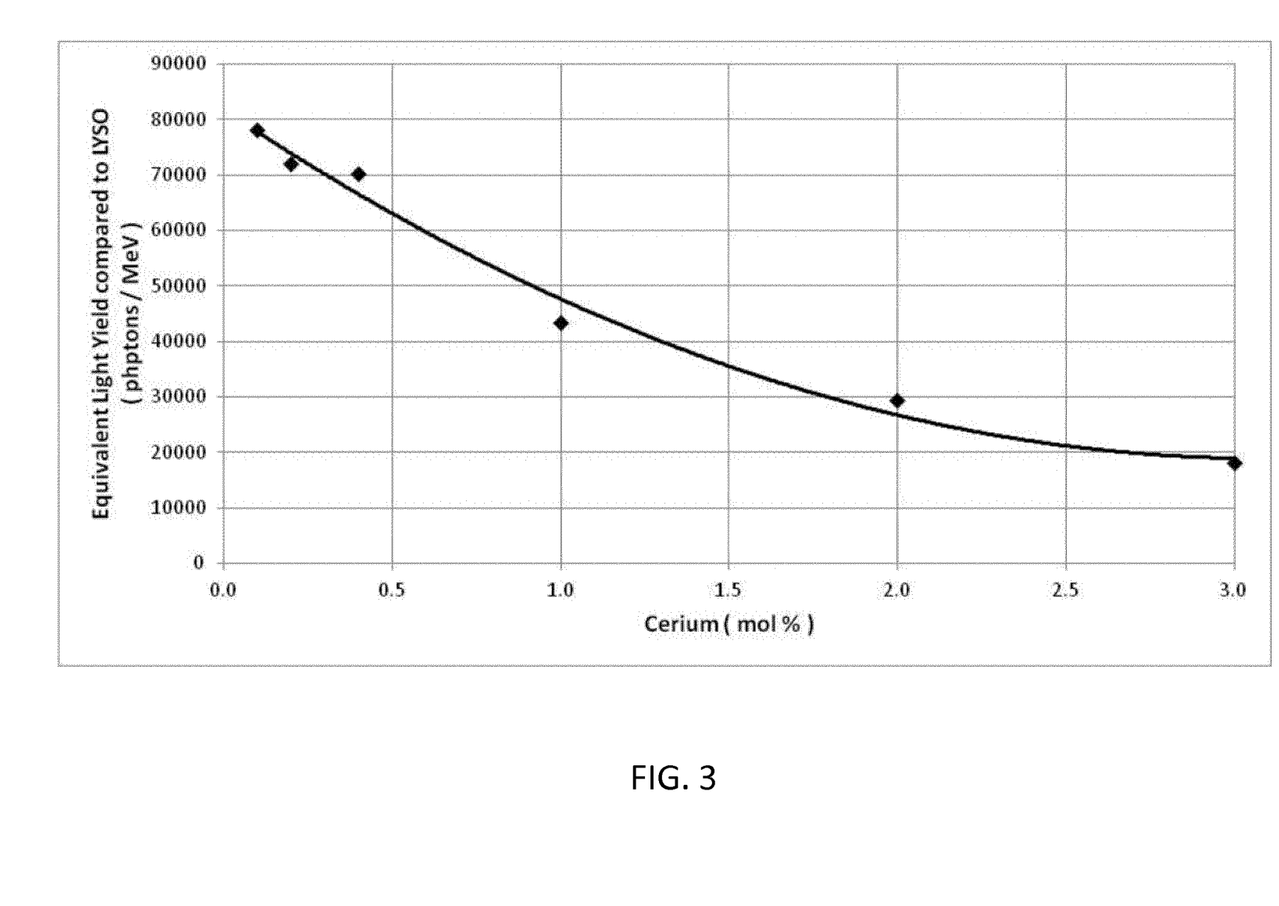
FIG. 3 illustrates the variation in equivalent light yield compared to LYSO with cerium dopant concentration in the range 0.1 mol % to 3.0 mol % in the ceramic garnet composition $(Gd_{2.7-y}Lu_{0.3}Ce_y)(Al_{2.5}Ga_{2.47} \ Lu_{0.03})O_{12}$ wherein y=0.03 corresponds to a cerium concentration of 1.0 mol %.

The effect of adding cerium to the garnet composition is to cause the emission of substantially green scintillation light from the garnet with particularly high light yield when struck by gamma photons having an energy that is close to the peak of the scintillation light response. FIG. 3 illustrates the variation in equivalent light yield compared to LYSO with cerium dopant concentration in the range 0.1 mol % to 3.0 mol % in the ceramic garnet composition $(Gd_{2.7-y}Lu_{0.3}Ce_y)(Al_{2.5}Ga_{2.47}Lu_{0.03})O_{12}$ wherein y=0.03 corresponds to a cerium concentration of 1.0 mol %. The equivalent light yield in FIG. 3 allows a direct comparison with the benchmark material LYSO to be made. At zero cerium concentration there will be inadequate light emission from the host material for it to act as a scintillator material. At the lowest plotted cerium concentration of 0.1 mol % a light yield of approximately 75000 photons/MeV was measured, from which an increase in cerium concentration causes the light yield to fall. Above approximately 1.0 mol % cerium the light yield falls to level where it ceases to be efficient to use the composition as a scintillator material. This demonstrates the effect of concentration quenching, which at high cerium doping levels reduces the light yield. It is undesirable to use the concentration quenching regime in PET imaging since the reduced light yield prevent a gamma photon detector from accurately discriminating between individual gamma photons.

The ceramic garnet materials from which the results of FIGS. 3 to 7 were obtained were formed by sintering the raw materials at 1650° C. for 8 h in vacuum, followed by a subsequent annealing stage at 1500° C. for 2 h in an oxygen environment.

Figure 4:
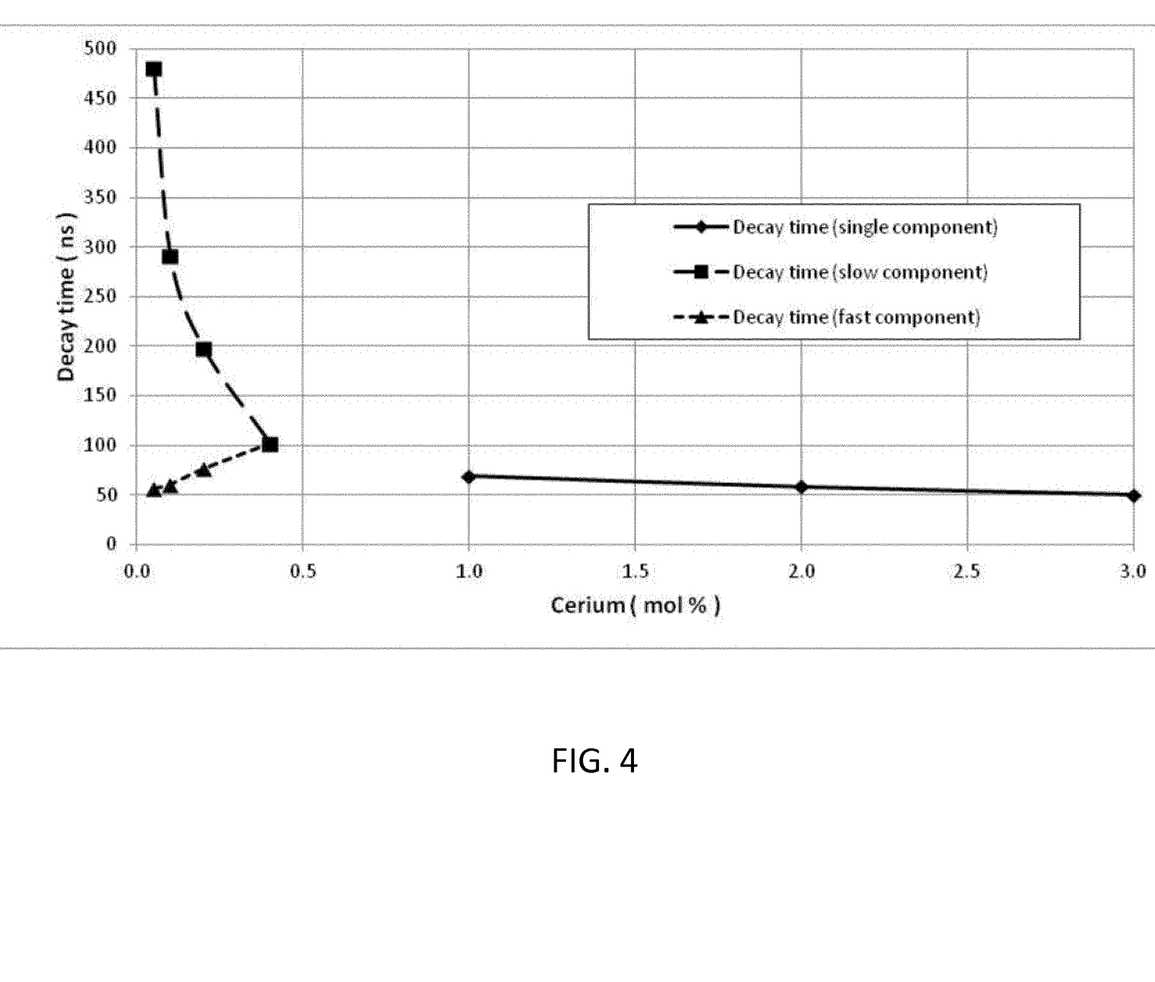
FIG. 4 illustrates the variation in decay time with cerium dopant concentration in the range 0.05 mol % to 3.0 mol % in the ceramic garnet composition $(Gd_{2.7-y}LU_{0.3}Ce_y)(Al_{2.5}Ga_{2.47} \ Lu_{0.03})O_{12}$ wherein y=0.03 corresponds to a cerium concentration of 1.0 mol %.

Further according to the first embodiment of the invention, FIG. 4 illustrates the variation in decay time with cerium dopant concentration in the range 0.05 mol % to 3.0 mol % in the ceramic garnet composition $(Gd_{2.7-y}Lu_{0.3}Ce_y)(Al_{2.5}Ga_{2.47}Lu_{0.03})O_{12}$ wherein y=0.03 corresponds to a cerium concentration of 1.0 mol %. FIG. 4 shows the decay time decreasing with increasing cerium concentration and was measured at a wavelength of 280 nm. At a cerium concentration of 0.4 mol % a decay time of 102 ns was recorded, the decay of the scintillation light being modelled with a single component to the time constant. Above this cerium concentration the decay time is also modelled by a single component to the time constant. However, below a cerium concentration of 0.4 mol % the decay time is modelled with a fast and a slow component to the time constant, and below a cerium concentration of 0.4 mol % the slow component to the time constant is seen to increase dramatically. A scintillator material with a short decay time is desirable in the provision of a gamma photon detector that can achieve high count rates, thereby avoiding "pile-up". A short decay time is furthermore advantageous in reducing the imaging duration of a PET imaging system. Decay times of less than 50 ns are typically considered appropriate for use in PET imaging. Below a cerium concentration of 0.1 mol %, thus above a decay time of approximately 300 ns, the rapidly-increasing decay time becomes too long to be considered a useful scintillator material owing to pile-up. Above a cerium concentration of 1.0 mol % cerium the light yield in FIG. 3 falls to a level where it ceases to be efficient to use the composition as a scintillator material. Consequently there is a narrow defined cerium concentration range 0.1 mol % to 1.0 mol %, restricted by the falling light yield at the upper cerium limit and by the risk of pile-up at the lower limit within which useful scintillation light can be obtained from this host material. As described above, the sensitivity of the scintillator material may be further improved by restricting the cerium concentration range in order to limit the decay time and improve the light yield. This is progressively reduced throughout the following series of ranges: 0.15 mol % to 1.0 mol %; 0.15 mol % to 0.6 mol %; 0.15 mol % to 0.5 mol %; 0.15 mol % to 0.4 mol %; 0.15 mol % to 0.2 mol %.

Figure 5:
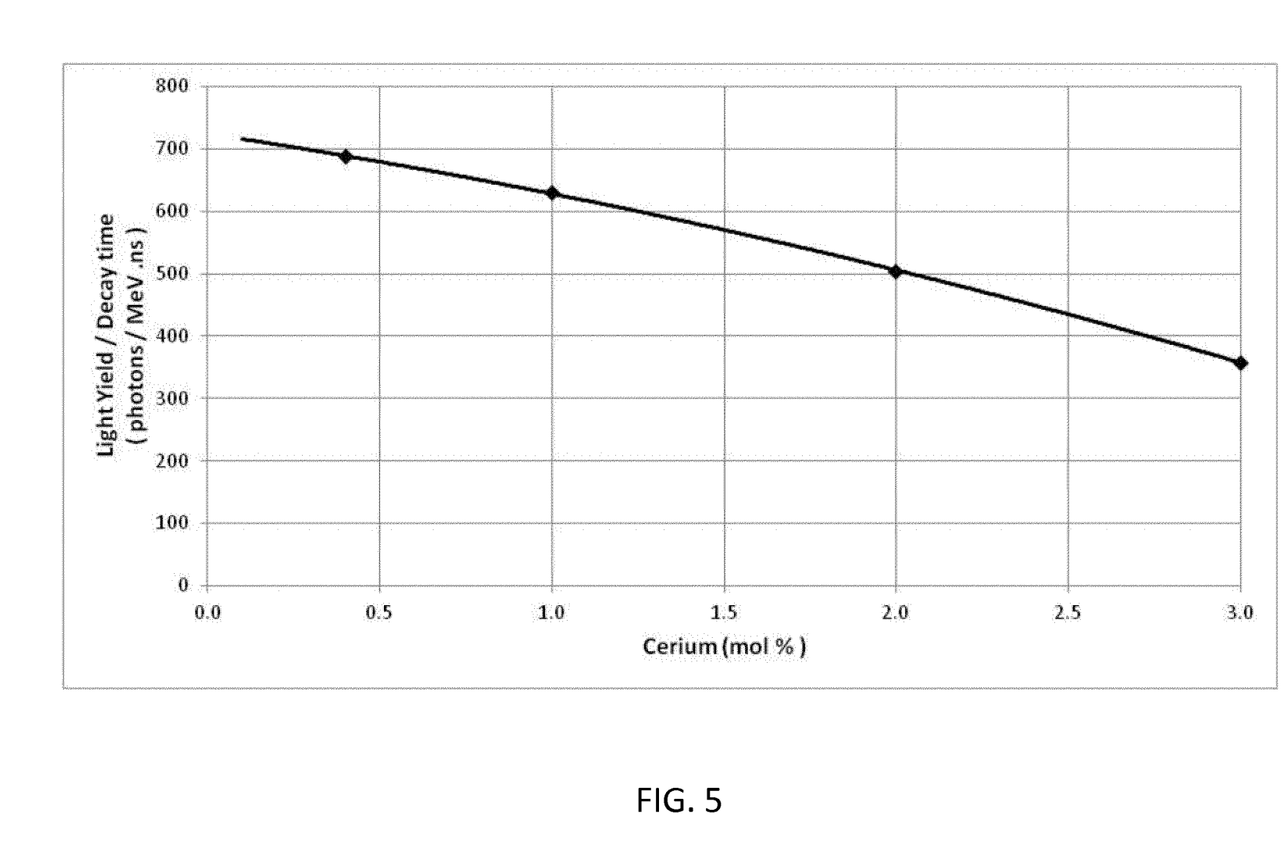
FIG. 5 illustrates the variation in the ratio of the light yield to the decay time with cerium dopant concentration in the range 0.1 mol % to 3.0 mol % in the ceramic garnet composition $(Gd_{2.7-y}Lu_{0.3}Ce_y)(Al_{2.5}Ga_{2.47} \ Lu_{0.03})O_{12}$ wherein y=0.03 corresponds to a cerium concentration of 1.0 mol %.

Further according to the first embodiment of the invention, FIG. 5 illustrates the variation in the ratio of the light yield to the decay time with cerium dopant concentration in the range 0.1 mol % to 3.0 mol % in the ceramic garnet composition $(Gd_{2.7-y}Lu_{0.3}Ce_y)(Al_{2.5}Ga_{2.47}Lu_{0.03})O_{12}$ wherein y=0.03 corresponds to a cerium concentration of 1.0 mol %. As described above, the ratio of the light yield to the decay time is indicative of the timing resolution of a gamma photon detector, and has particular application in the field of TOF PET imaging in which the timing resolution affects the spatial resolution of the images thus produced. In these materials the light yield exceeds 40000 photons/MeV and the ratio of light yield to decay time exceeds approximately 600 photons/MeV·ns within the cerium concentration range 0.1 mol % to 1.0 mol %, identifying the material as being particularly useful in a TOF PET imaging system. Outside this range the reduced light yield degrades the timing performance since it reduces the amplitude of the electrical signal produced by a gamma photon detector. A further improvement in timing resolution can be achieved by reducing the range of the cerium concentration throughout the following series of ranges: 0.15 mol % to 1.0 mol %; 0.15 mol % to 0.4 mol %; 0.15 mol % to 0.2 mol %.

Figure 6:
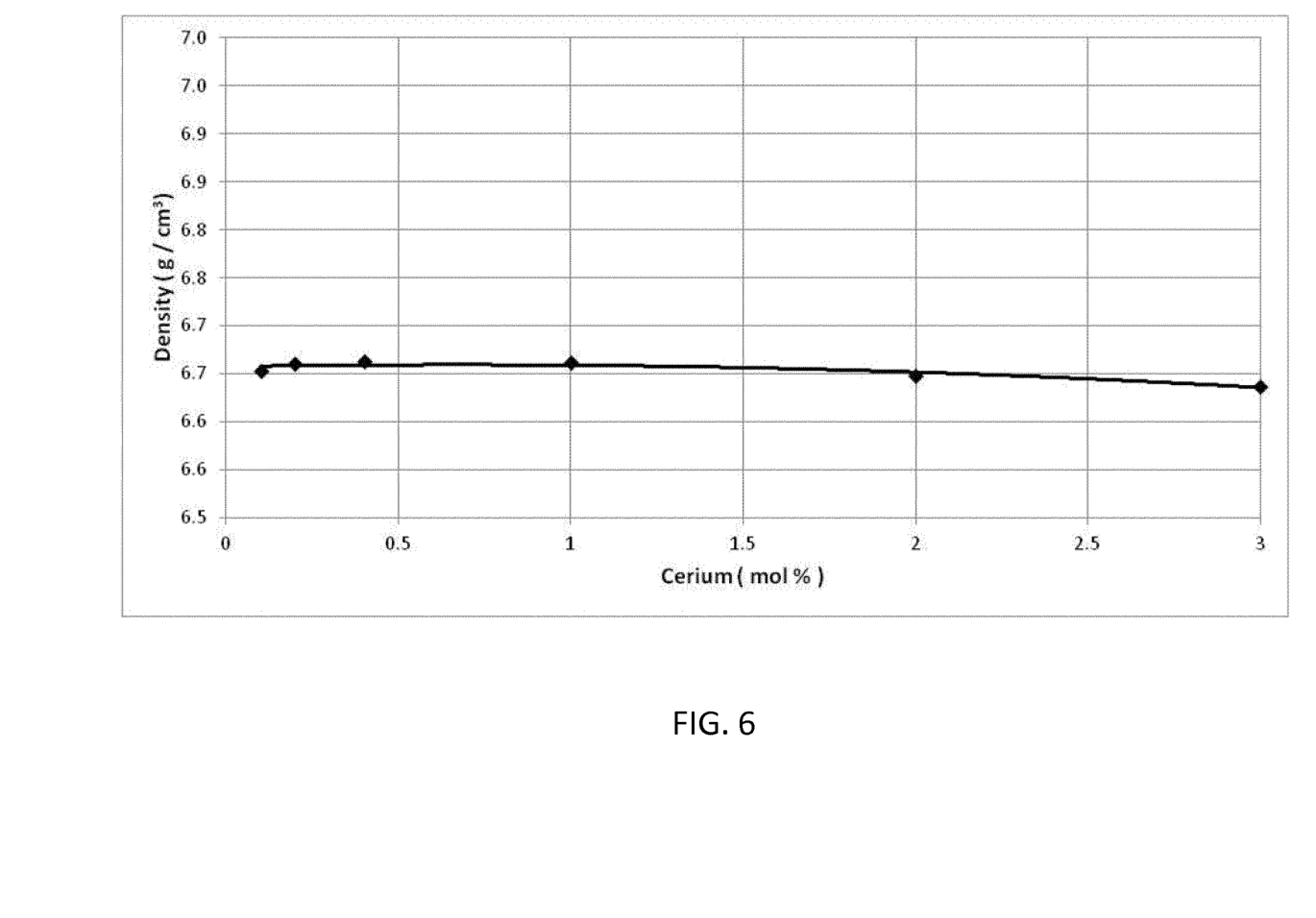
FIG. 6 illustrates the variation in composition density with cerium dopant concentration in the range 0.1 mol % to 3.0 mol % in the ceramic garnet composition $(Gd_{2.7-y}LU_{0.3}Ce_y)(Al_{2.5}Ga_{2.47} \ Lu_{0.03})O_{12}$ wherein y=0.03 corresponds to a cerium concentration of 1.0 mol %

Further according to the first embodiment of the invention, FIG. 6 illustrates the variation in composition density with cerium dopant concentration in the range 0.1 mol % to 3.0 mol % in the ceramic garnet composition $(Gd_{2.7-y}Lu_{0.3}Ce_y)(Al_{2.5}Ga_{2.47}Lu_{0.03})O_{12}$ wherein y=0.03 corresponds to a cerium concentration of 1.0 mol %. The density of this composition can be changed most effectively by changing the concentration of the lutetium. A scintillator material composition having a density in excess of 5 g/cm³ is typically considered appropriate for use in a PET imaging system. This results from the need to absorb a significant proportion of the incident gamma photons without making the scintillator material too thick. Thick scintillator materials result in large gamma photon detectors which consequently occupy more space in a PET imaging system. A scintillator material composition having a density in excess of 7 g/cm$^3$ is even more preferable since this leads to a more compact gamma photon detector. Scintillator materials having the combination of necessary properties with densities in excess of 8 g/cm$^3$ are difficult to realise in practice.

Figure 7:
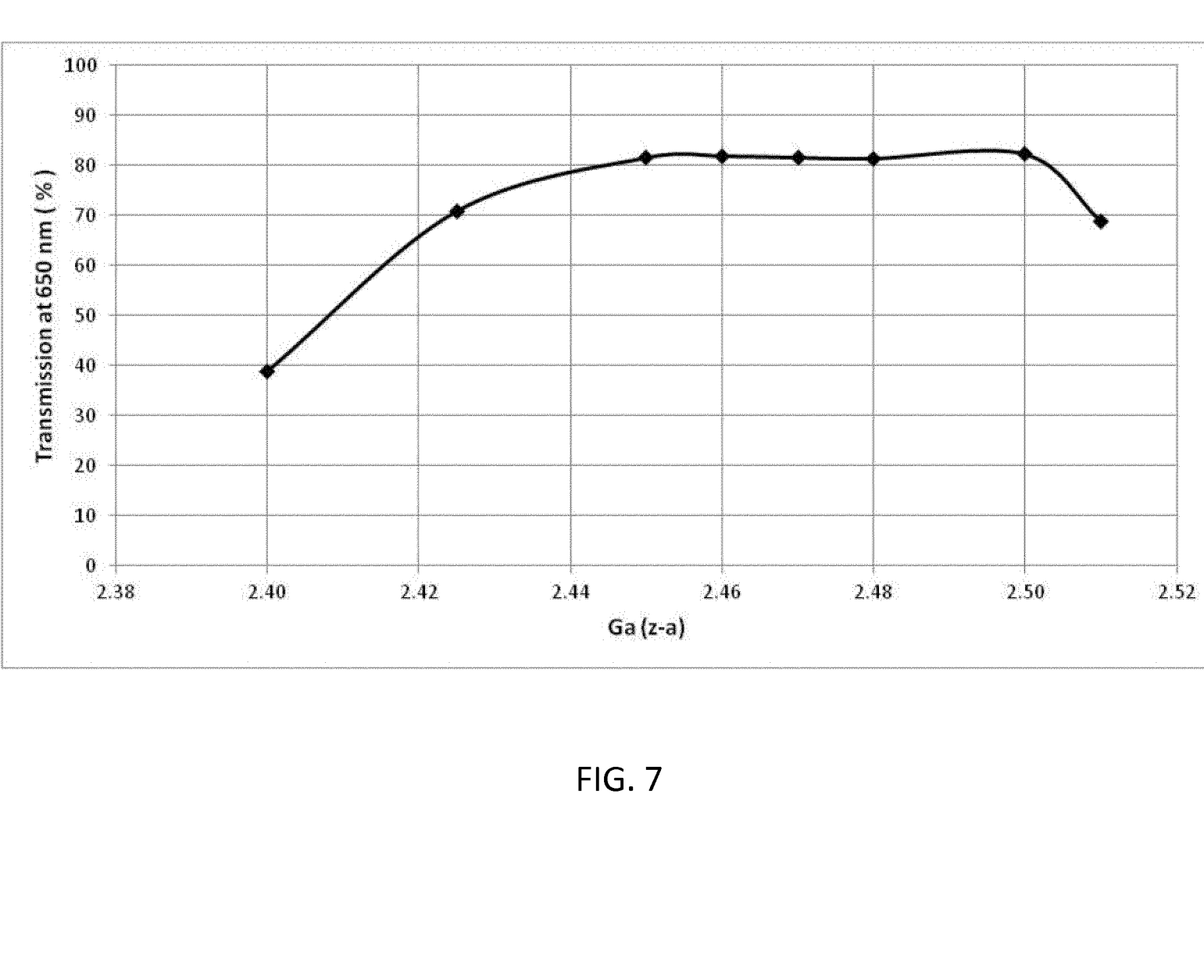
FIG. 7 illustrates the variation in optical transmission at a wavelength of 650 nm of the ceramic garnet composition $(Gd_{2.688}Lu_{x+a}Ce_{0.012})(Al_{2.5}Ga_{z-a})O_{12}$ wherein x=0.3 and z=2.5

Further according to the first embodiment of the invention, FIG. 7 illustrates the variation in optical transmission at a wavelength of 650 nm of the ceramic garnet composition $(Gd_{2.688}Lu_{x+a}Ce_{0.012})(Al_{2.5}Ga_{z-a})O_{12}$ wherein x=0.3 and z=2.5. FIG. 7 demonstrates that the transmission of a garnet composition may be controlled by adjusting its stoichiometry; particularly in this case by adjusting the amount of gallium in relation to the amount of lutetium. High transparency is desirable in a scintillator material since it improves the detection efficiency of the scintillation light. The stoichiometry can therefore be used to improve the sensitivity of a scintillator material and furthermore the sensitivity of a gamma photon detector and a PET imaging system. In FIG. 7, (z−a)=2.5 is exactly stoichiometric. Good optical transparency is observed for (z−a) in the range 2.41 to 2.51; and a further improvement is observed in the range 2.44 to 2.5.

According to a second embodiment a scintillator material having the composition represented by $(Gd_{3-x-y}Lu_xCe_y)(Al_{5-z}Ga_{z-a}Lu_a)O_{12}$ is disclosed in an exemplary application of PET imaging. In this composition the cerium doping is represented by $Ce_y$. By maintaining the concentration of cerium in the same range as the first embodiment, thus 0.1 mol % to 1.0 mol %, the same benefits are achieved in this broader group of garnets. According to the second embodiment, x is in the range 0 to 0.6; y is in the range 0.003 to 0.03 and corresponds to an amount of cerium in the range 0.1 mol % to 1.0 mol %; z is in the range 1.5 to 3.5; a is in the range 0 to 0.3. Preferably, x is in the range 0 to 0.5, y is in the range 0.003 to 0.018, z is in the range 2 to 3 and a is in the range 0 to 0.2. Even more preferably x is in the range 0 to 0.4, y is in the range 0.003 to 0.015, z is in the range 2.4 to 2.6 and a is in the range 0 to 0.05.

According to a third embodiment a scintillator material having the composition represented by $(M_{3-x-y}N_xCe_y)(Al_{5-z}C_{z-a}D_a)O_{12}$ is disclosed in an exemplary application of PET imaging. In this composition the cerium doping is represented by $Ce_y$. By maintaining the amount of cerium in the same range as the first embodiment, thus 0.1 mol % to 1.0 mol %, the same benefits are achieved in this broader group of garnets. According to the third embodiment, M is selected from the group comprising lanthanides and yttrium; N is selected from the group comprising alkali metals, alkaline earth metals and hathium; C and D are different elements selected from the group: lithium, magnesium, gallium, lutetium, group IIIa elements, Group IVa elements, Group Va elements and Gp IIId transition metals; x is in the range 0 to 0.6; y is in the range 0.003 to 0.03 and corresponds to an amount of cerium in the range 0.1 mol % to 1.0 mol %; z is in the range 1.5 to 3.5; a is in the range 0 to 0.3. Preferably, x is in the range 0 to 0.5, y is in the range 0.003 to 0.018, z is in the range 2 to 3 and a is in the range 0 to 0.2. Even more preferably x is in the range 0 to 0.4, y is in the range 0.003 to 0.015, z is in the range 2.4 to 2.6 and a is in the range 0 to 0.05.

According to a fourth embodiment a scintillator material comprising a garnet doped with cerium; wherein the amount of cerium is in the range 0.1 mol % to 1.0 mol % is disclosed in an exemplary application of PET imaging. By maintaining the amount of cerium in the same range as the first embodiment, thus 0.1 mol % to 1.0 mol %, the same benefits are achieved in this even broader group of garnets.

According to a fifth embodiment a scintillator material comprising a scintillator host material doped with cerium; wherein the scintillator host material is at least one garnet selected from the group comprising i) $Y_3Al_5O_{12}$ ii) $Tb_3Al_5O_{12}$ iii) $Gd_3(Al,Ga)_5O_{12}$; iv) $Lu_3Al_5O_{12}$ including solid solutions of these materials and wherein the amount of cerium is in the range 0.1 mol % to 1.0 mol % is disclosed in an exemplary application of PET imaging. By maintaining the amount of cerium in the same range as the first embodiment, thus 0.1 mol % to 1.0 mol %, the same benefits are achieved in this group of garnets.

According to a sixth embodiment a scintillator material comprising a scintillator host material doped with cerium; wherein the scintillator host material is at least one sulphide from the group comprising $CaGa_2S_4$, $SrGa_2S_4$, $BaGa_2S_4$, CaS, SrS; and wherein the amount of cerium is in the range 0.1 mol % to 1.0 mol % is disclosed in an exemplary application of PET imaging. By maintaining the amount of cerium in the same range as the first embodiment, thus 0.1 mol % to 1.0 mol %, the same benefits are achieved in this group of sulphides.

As described above, the longer decay times measured in the disclosed group of scintillator materials may, contrary to typical prejudice, be used in gamma photon detection for example in a PET imaging system using the trade-offs between the decay time and the gamma photon receiving area, the active area of the optical detector, and the gamma photon readout area.

According to a seventh embodiment, the use of any of the scintillator materials disclosed in the first six embodiments is used in optical communication with an optical detector having either a gamma photon receiving area or an active area of less than 5 cm$^2$. The resulting combination is termed a gamma photon detector. Examples of suitable optical detectors include a PMT and a solid state semiconductor optical detector. By further reducing either the gamma photon detector's gamma photon receiving area, or its active area, the gamma photon detector becomes increasingly tolerant of longer decay time scintillator materials in which a lower concentration of cerium is required and in which a higher light yield is achieved. Such areas in the following ranges lead to an increased tolerance of decay time: less than 2.5 cm$^2$; less than 1 cm$^2$; less than 0.5 cm$^2$; less than 0.2 cm$^2$; less than 0.1 cm$^2$.

According to an eighth embodiment, the cerium concentration in any of the scintillator materials disclosed in the first seven embodiments is controlled such that the decay time is in the range 60 ns to 300 ns and the resulting scintillator material is used in optical communication with an optical detector having either a gamma photon receiving area or an active area of less than 5 cm$^2$. The resulting combination is termed a gamma photon detector. In contrast to typical materials assumptions made of scintillator materials, such a range in decay time is tolerable in small-area gamma photon detectors such as for example solid state semiconductor optical detectors used in digital PET.

According to a ninth embodiment the cerium concentration in any of the scintillator materials disclosed in the first eight embodiments is controlled such that the light yield exceeds 40000 photons/MeV at a gamma photon energy of 511 keV. Such high light yield values indicate high sensitivity to gamma photons and provide a sensitive gamma photon detector.

According to a tenth embodiment the cerium concentration in any of the scintillator materials disclosed in the first nine embodiments is controlled such that the ratio of the light yield to the decay time exceeds 600 photons/MeV·ns. Scintillator materials having such ratios are particularly useful in gamma photon detection, for example in Time of Flight PET imaging in which good timing resolution is important.

According to an eleventh embodiment the scintillator material from any of the first ten embodiments is used in combination with an optical detector having high optical responsivity in the wavelength range 450 nm to 700 nm. The scintillation light emitted by these materials is inherently close to the green region of the optical spectrum. Therefore when used in combination with such an optical detector a more sensitive gamma photon detector is provided. The scintillation light emitted by the ceramic garnet composition $(Gd_{2.7-y}Lu_{0.3}Ce_y)(Al_{2.5}Ga_{2.47}Lu_{0.03})O_{12}$ with a cerium concentration range 0.1 mol % to 1.0 mol % corresponds to green emission at approximately 550 nm. At 550 nm the scintillation light may be detected using a number of optical detectors including PMTs and solid state semiconductor optical detectors such as a silicon avalanche photodiode (Si APD) and silicon photomultipliers (SiPM) but when standard optical detectors are used the detection efficiency is poor. The sensitivity of an associated optical detector in a gamma photon detector or in a PET imaging system employing the scintillator material may be optimised to have a peak sensitivity that is matched to the emission spectrum of the scintillator material in order to improve the sensitivity to gamma photons. For the disclosed scintillator material this should correspond to the wavelength interval 450 nm to 700 nm, and preferably the range 500 nm to 650 nm. This may be achieved by using a special PMT, for example Hamamatsu R9880U-20, R7600U-20. Alternatively a red-extended PMT employing $Na_2KSb:Cs$ may be used. Alternatively this may be achieved by using a solid state semiconductor optical detector comprising a silicon detector having the structure n+-i-p+ with the $n^+$ layer closer to the scintillator material and thus the gamma photon source than the p+ layer. Preferably the active i layer should have a thickness greater than approximately 1.5 microns. This structure improves the sensitivity at green optical wavelengths. Typically a blue-sensitive a solid state semiconductor optical detector would be fabricated with the $p^+$ layer on top and thus facing the gamma photon source.

According to a twelfth embodiment any of the scintillator materials disclosed in the first six embodiments is used in optical communication with a PMT optical detector to form a gamma photon detector, and a plurality of such gamma photon detectors are used in an analogue PET imaging system in which the gamma photon readout area is less than 33 $cm^2$. By further reducing the gamma photon readout area, a longer decay time is tolerable, which may be achieved by using a lower cerium dopant concentration with the benefit of improved light yield. Thus in analogue PET a gamma photon readout area in the following ranges is appropriate: less than 33 $cm^2$; less than 15 $cm^2$; less than 10 $cm^2$; less than 5 $cm^2$; less than 2.5 $cm^2$; less than 1 $cm^2$; less than 0.5 $cm^2$; less than 0.2 $cm^2$; less than 0.1 $cm^2$; with the benefit of increasing light yield being achieved throughout this series by virtue of the lower cerium concentration used.

According to a thirteenth embodiment any of the scintillator materials disclosed in the first six embodiments is used in optical communication with a solid state semiconductor optical detector to form a gamma photon detector, and a plurality of such gamma photon detectors are used in a digital PET imaging system in which the gamma photon readout area is less than 10 $cm^2$. By further reducing the gamma photon readout area, again a longer decay time is tolerable. This may be achieved by using a lower cerium dopant concentration with the benefit of improved light yield. Thus in digital PET a gamma photon readout area in the following ranges is appropriate: less than 10 $cm^2$; less than 5 $cm^2$; less than 4 $cm^2$; less than 2 $cm^2$; less than 1 $cm^2$; less than 0.5 $cm^2$; less than 0.2 $cm^2$; less than 0.1 $cm^2$; with the benefit of increasing light yields being attainable throughout this series by virtue of the lower cerium concentration used.

According to any of the disclosed embodiments the scintillator material composition may have either an amorphous, thus ceramic, or polycrystalline, or crystalline structure. Ceramics have the benefit of being easier to fabricate and shape, requiring reduced post-processing as compared to more ordered structures. Increasing the order within the structure by moving from a ceramic to polycrystalline structure, and furthermore to the most ordered, a crystalline structure, acts to improve the optical transparency of the scintillator material at the peak emission wavelength. This is desirable since it reduces the probability of re-absorption of scintillation light, thus improving the sensitivity of a gamma photon detector or a PET imaging system made with such a scintillation material. All three structural forms of the garnet composition are appropriate for use as a scintillation material for detecting gamma photons.

To summarise, various embodiments of a scintillator material comprising a scintillator host material doped with cerium are disclosed herein, in which the scintillator host material is at least one of the group comprising i) garnets ii) $CaGa_2S_4$ iii) $SrGa_2S_4$ iv) $BaGa_2S_4$ v) $CaS$ vi) $SrS$, and the cerium doping concentration in the range 0.1% to 1.0 mol %. When the cerium concentration is in the disclosed range the scintillation material has a high light yield leading to improved sensitivity when used as a scintillator material, and has particular exemplary application in a gamma photon detector and furthermore in a PET imaging system employing such a gamma photon detector.

Whilst the invention has been illustrated and described in detail in the drawings and foregoing description, such illustrations and description are to be considered illustrative or exemplary and not restrictive; the invention is not limited to the disclosed embodiments and can be used in various forms of gamma photon detection.

The invention claimed is:

1. A gamma photon detector for detecting individual 511 keV gamma photons in a PET imaging system, the gamm photon detector comprising:
   an optical detector; and
   a garnet scintillator material with a substantially ceramic or polycrystalline structure and a decay time of less than 300 ns having the composition represented by $(Gd_{3-x-y}Lu_xCe_y)(Al_{5-z}Ga_{z-a}Lu_a)O_{12}$, wherein:
   x is in the range 0 to 0.6,
   y is in the range 0.003 to 0.03,
   z is in the range 1.5 to 3.5,
   a is in the range 0 to 0.3,
   z-a is in a range of 2.41 to 2.51,
   cerium (Ce) has a concentration of 0.15 to 0.6 mol %,
   the scintillator material has a density in excess of 7 $g/cm^3$, and
   a gamma photon read out area is less than 5 $cm^2$.

2. The gamma photon detector according to claim 1, wherein the garnet scintillator material has a composition represented by $(Gd_{2.7-y}Lu_{0.3}Ce_y)(Al_{2.5}Ga_{2.47} Lu_{0.03})O_{12}$ wherein y is in the range 0.003 to 0.03.

3. The gamma photon detector according to claim 2, wherein the garnet scintillator material has a decay time of less than 300 ns.

4. The gamma photon detector according to claim 1, wherein the scintillator composition is controlled such that the scintillator material has a density in excess of 8 g/cm$^3$.

5. A PET imaging system having an imaging region and comprising:
   a plurality of gamma photon detectors according to claim 1 disposed radially about the imaging region and configured to receive gamma photons from said imaging region, wherein each gamma photon includes a solid state semiconductor optical detector.

6. A method of generating a PET image indicative of the distribution of a radiotracer within an imaging region, the method comprising: administering a radiotracer to a subject; waiting for a predefined uptake period after administering the radiotracer; and imaging at least a portion of the subject with the PET imaging system according to claim 5.

7. The PET imaging system according to claim 5, wherein:
   the cerium concentration is 0.15 to 0.4 mol %, and
   the gamma photon read out area is less than 0.5 cm$^2$.

8. The PET imaging system according to claim 7, wherein:
   a=0.03.

9. The PET imaging system according to claim 5, wherein:
   the cerium concentration is 0.15 to 0.2 mol %, and
   the read out area is less than 0.2 cm$^2$.

10. The gamma photon detector according to claim 1, wherein the cerium concentration is 0.15 to 0.4 mol %.

11. The gamma photon detector according to claim 10, wherein the gamma photon read out area is less than 0.5 cm$^2$.

12. The gamma photon detector according to claim 10, wherein the gamma photon read out area is less than 0.2 cm$^2$.

13. The gamma photon detector according to claim 1, wherein the cerium concentration is 0.15 to 0.2 mol %.

14. The gamma photon detector according to claim 13, wherein the gamma photon read out area is less than 0.2 cm$^2$.

15. The gamma photon detector according to claim 13, wherein the gamma photon read out area is less than 0.1 cm$^2$.

16. The gamma photon detector according to claim 1, wherein the gamma photon read out area is less than 2 cm$^2$.

17. The gamma photon detector according to claim 1, wherein the gamma photon read out area is less than 1 cm$^2$.

18. The gamma photon detector according to claim 1, wherein the gamma photon read out area is less than 0.5 cm$^2$.

19. The gamma photon detector according to claim 1, wherein the gamma photon read out area is less than 0.2 cm$^2$.

20. The gamma photon detector according to claim 1, wherein the gamma photon read out area is less than 0.1 cm$^2$.

* * * * *